Figure 1:
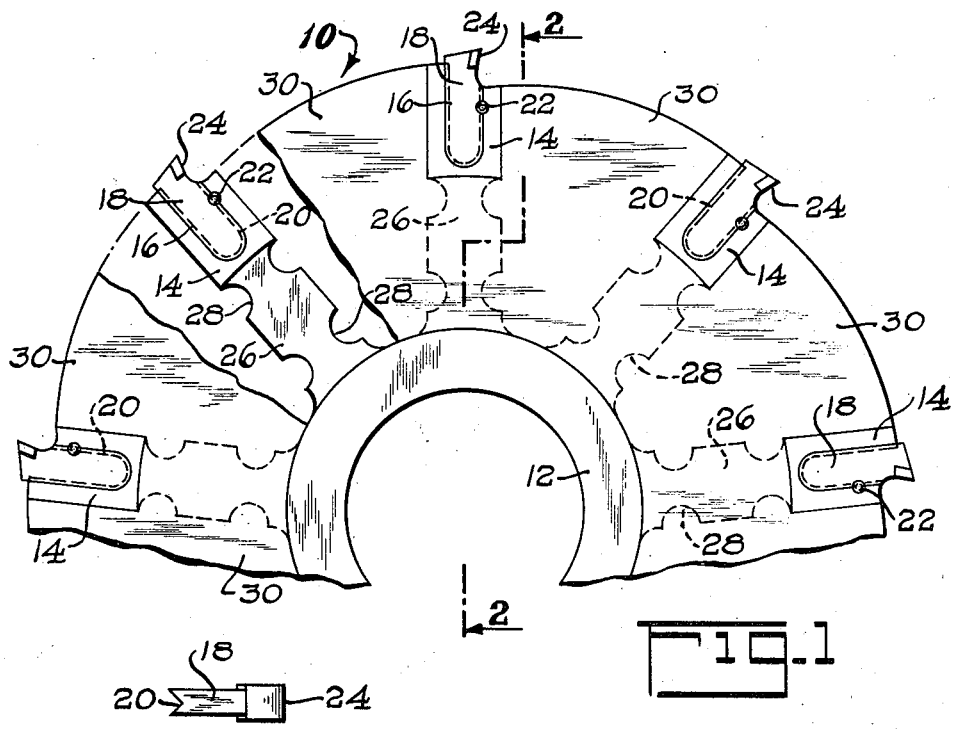

Oct. 3, 1944.　　　　　E. PREECE　　　　　2,359,675
REINFORCED PLASTIC CUTTER
Filed July 26, 1943

INVENTOR
ERIC PREECE.
BY
ATTORNEY

Patented Oct. 3, 1944

2,359,675

UNITED STATES PATENT OFFICE 2,359,675

REINFORCED PLASTIC CUTTER

Eric Preece, Hawthorne, N. J., assignor to Wright Aeronautical Corporation, a corporation of New York Application July 26, 1943, Serial No. 496,230

5 Claims. (Cl. 29—105)

This invention relates to a circular saw and is particularly directed to a circular saw which is constructed so as to dampen vibrations so prevalent in conventional circular saws.

The conventional circular saw comprises a flat metal plate-like diaphragm having a plurality of teeth along its periphery. In this prior art construction such flat plate-like circular saws commonly require hammering in order to make them conform to a true planar condition, thereby setting up all sorts of stresses in the body of the saw which stresses induce considerable vibration and noise when the saw is put to use. It is an object of this invention to provide a circular saw which does not require the above mentioned straightening and which, in addition, is constructed so as to dampen vibrations of the saw when in use. It is a further object of this invention to provide a composite part metal and part plastic saw in which the plastic material is disposed so as to dampen possible vibrations of the saw.

Specifically, one form of the invention comprises a metallic diaphragm, shaped similar to the hub and spokes of a wheel, with plastic material or a plastic-impregnated laminated fabric composition disposed between each spoke and with saw teeth disposed at the outer ends of the spokes. In a second form of the invention, the saw teeth are disposed about the periphery of a saw body made of plastic material or of a plastic-impregnated laminated fabric composition.

Figure 3:
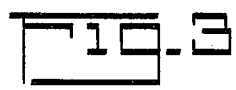
Figure 4:
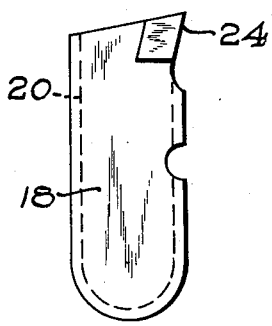
Figure 2:
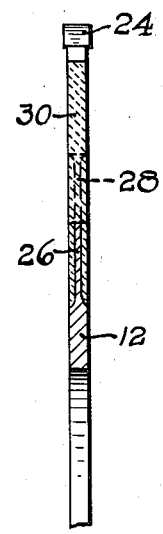
Figure 5:
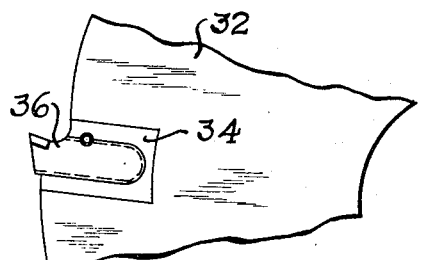

Other objects of the invention will become apparent from the annexed detailed description when read in connection with the drawing in which:

Fig. 1 is a plan view of a portion of a circular saw, constructed in accordance with this invention, Fig. 2 is a section on line 2—2 of Fig. 1, Figs. 3 and 4 are enlarged views of the cutter inserts, and Fig. 5 is a partial plan view of a modification.

Referring to the drawing, there is shown a circular saw 10 having a metal hub portion 12 from which a plurality of metal spoke-like arms 14 project. The outer periphery of each of the arms 14 is provided with a substantially radial cutout portion 16 adapted to receive a tooth-carrying insert 18. These inserts are of conventional construction and are secured within the cutout portion 16 by an interfitted V-shaped tongue-and-groove construction 20 and by a locking pin 22. The saw teeth 24 are welded or otherwise secured to the inserts 18.

The inner ends of the spoke-like arms 14 are of reduced thickness and preferably are provided with a scalloped edge construction 26. The body of the saw is completed by a laminated plastic structure 30 formed under heat and pressure and comprising a plurality of layers of canvas or other fabric material impregnated with a suitable binder are plastic such as phenol formaldehyde. Such material of reinforced plastic composition is very strong and is commercially available as e. g., "Micarta" and "Panelyte." However, the particular composition forms no part of the present invention since, obviously, any suitable material may be used. This laminated plastic structure is disposed between the spokes and over their reduced thickness portion to provide a composite saw of uniform thickness. For example, the saw body may be completed as follows: A plurality of layers of a fabric impregnated with a suitable plastic or binder material are shaped to conform to the space between the outer diameter of the hub 12 and the outer periphery of the saw and across the reduced thickness portion of the spoke-like arms 14. These layers are placed in a suitable mold and the spoke-like saw structure is placed in position over this laminated plastic structure thereby completing one side of the saw. The intermediate portion of the saw body corresponding to the reduced thickness portion 25 of the spoke-like arms may also be built up with a similar laminated structure or this portion may be filled up with a macerated plastic-impregnated fabric. The remaining side of the saw is then completed with a similar laminated plastic structure. The composite saw body is then subjected to suitable pressure and heat to bond the plastic layers together to form a unitary saw body. The particular process by which the laminated fabric is formed about the metallic spoke-like structure is conventional and forms no part of the present invention. With this construction the reinforced laminated plastic is securely locked between the spokes against both axial and radial displacement. The scalloped edge construction 28 adds to the strength of the interlock between the plastic and metallic portions of the saw.

In the conventional construction of a circular saw, the saw blade is a one piece annular construction and is provided either with integral saw teeth or with tooth-carrying inserts similar to those described above. Such a saw blade does not remain true during the hardening process and, therefore, generally is hammered to properly flatten or tension the body of the circular saw. This difficulty is not present in the above tion, the laminated plastic material disposed between and over the spokes maintains these spokes in a true plane condition. Also, the plastic material inherently tends to dampen out any vibrations set up in a metallic portion of the saw during its use. This composite plastic and metallic saw is particularly useful at high speeds and for cutting deep slots e. g., for cutting fins on the cylinder heads of an aircooled internal combustion engine.

Fig. 5 illustrates a modification in which the entire body of the saw is a reinforced plastic construction 32 which may have a composition similar to the above described laminated reinforced plastic structure. A plurality of shoes 34 are molded within the periphery of the saw as illustrated and these shoes are adapted to receive the saw teeth inserts 36 in the conventional manner. In other words, the construction of Fig. 5 is similar to Fig. 1 except that the reduced thickness portion 26 of the spoke-like arms 14 and their associated hub portion 12 have been eliminated. The surface of the shoes 34 engaged by the plastic may be roughened or these shoes may be shaped so as to insure positive engagement between the shoes and the plastic.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A circular saw comprising a metallic hub structure having a plurality of radial spoke-like arms extending therefrom, saw teeth at the outer periphery of said spoke-like arms, and a plastic-impregnated laminated fabric structure disposed between said spoke-like arms.

2. A circular saw comprising a metallic hub structure having a plurality of radial spoke-like arms extending therefrom, cutter teeth at the outer periphery of said arms, and plastic material disposed between said spoke-like arms in such a manner that said hub, spoke-like arms and plastic material comprise a composite saw body of substantially uniform thickness.

3. A circular saw comprising a metallic hub structure having a plurality of radial spoke-like arms having saw teeth at their outer periphery, each of said spoke-like arms having a portion of reduced axial thickness inwardly spaced from their outer periphery, and a laminated reinforced plastic structure disposed between said spoke-like arms and over said reduced thickness portions to provide a composite circular saw of substantially uniform thickness.

4. A cutting tool comprising a metallic portion having a plurality of projections extending therefrom and spaced along the path of motion of said tool, cutter teeth at the outer edge of said projecting portions, and non-metallic material disposed between said projecting portions.

5. A cutting tool comprising a metallic hub structure having a plurality of radial spoke-like arms extending therefrom, cutter teeth at the outer periphery of said arms, and non-metallic material disposed between said spoke-like arms.

ERIC PREECE.